US007822438B2

(12) United States Patent
Parron et al.

(10) Patent No.: US 7,822,438 B2
(45) Date of Patent: Oct. 26, 2010

(54) APPARATUS AND METHOD FOR RESPONDING TO UNLICENSED NETWORK FAILURE

(75) Inventors: Jerome Parron, Toulouse (FR); Marcia J. Otting, Mundelein, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 890 days.

(21) Appl. No.: 11/481,578

(22) Filed: Jul. 6, 2006

(65) Prior Publication Data

US 2007/0099653 A1 May 3, 2007

(51) Int. Cl.
*H04M 1/00* (2006.01)
(52) U.S. Cl. ............... 455/552.1; 455/553.1; 455/550.1; 370/328
(58) Field of Classification Search ........... 455/403, 455/414.1, 426.1, 426.2, 432.1, 434, 435.2, 455/435.3, 436, 445, 550.1, 552.2, 553.1, 455/554.2; 370/310, 328, 331, 338, 329
See application file for complete search history.

(56) References Cited

U.S. PATENT DOCUMENTS

| 7,146,130 | B2 * | 12/2006 | Hsu et al. | .................. 455/3.04 |
| 2002/0085516 | A1 | 7/2002 | Bridgelall | |
| 2004/0063426 | A1 | 4/2004 | Hunkeler | |
| 2004/0165563 | A1 | 8/2004 | Hsu et al. | |
| 2004/0170191 | A1 | 9/2004 | Guo et al. | |
| 2005/0186948 | A1 | 8/2005 | Gallagher et al. | |
| 2005/0255870 | A1 * | 11/2005 | Chang et al. | ................ 455/502 |

OTHER PUBLICATIONS

Li Ma, Fei Yu and Victor C. M. Leung, "SMART-FRX: A Novel Error-Recovery Scheme to Improve Performance of Mobile SCTP during WLAN to Cellular Forced Vertical Handover", IEEE Communications Society / WCNC 2004, 0-7803-8966-2/05, 6 pages.

* cited by examiner

*Primary Examiner*—Jean A Gelin

(57) ABSTRACT

An apparatus and method for responding to unlicensed network failure. A failure in a connection to an unlicensed wireless local area network controller can be detected. A wireless local area network access point connection to the unlicensed wireless local area network controller can be released. An attempt can be made to access wireless wide area network services.

20 Claims, 4 Drawing Sheets

APPARATUS AND METHOD FOR RESPONDING TO UNLICENSED NETWORK FAILURE

BACKGROUND

1. Field

The present disclosure is directed to a method and apparatus for responding to unlicensed network failure. More particularly, the present disclosure is directed to releasing an unlicensed network access point connection in response to detecting a failure in a connection to the unlicensed network.

2. Description of Related Art

Presently, a wireless communication device can receive service using unlicensed mobile access services. For example, the wireless communication device can receive service from wireless local area network services that utilize technology such as Bluetooth technology, 802.11 technology, ad hoc wireless local area network technology, infrared technology, or any other wireless local area network technology.

Unfortunately, in some scenarios, the wireless communication device may remain connected to a wireless local area network access point even when it is not possible to have access to any services through this access point. This results at least two major drawbacks. The first is the wireless communication device wastes power because it maintains the connection while attempting to reacquire services. The second is that a user of the wireless communication device loses network access when the services are not provided. In particular, if there is an unlicensed mobile access network controller failure, the wireless communication device will attempt several registration attempts and several discovery attempts. While these registration and discovery attempts are made, the wireless local area network link is maintained, but the wireless communication device cannot send or receive data because the transmission control protocol link is unavailable and the wireless communication device is not allowed to reestablish it. The discovery attempts are governed by a timer, which is doubled each time a discovery attempt is made. Consequently, the total attempts can take more than 1 hour. This results in a significant period of time without service for the wireless communication device. This also results in significant current drain on the wireless device because the link to the wireless local area network is maintained.

Thus, there is a need for an apparatus and method for responding to unlicensed network failure.

SUMMARY

An apparatus and method for responding to unlicensed network failure. A failure in a connection to an unlicensed wireless local area network controller can be detected. A wireless local area network access point connection to the unlicensed wireless local area network controller can be released. An attempt can be made to access wireless wide area network services.

BRIEF DESCRIPTION OF THE DRAWINGS

The embodiments of the present disclosure will be described with reference to the following figures, wherein like numerals designate like elements, and wherein.

DETAILED DESCRIPTION

Figure 1:
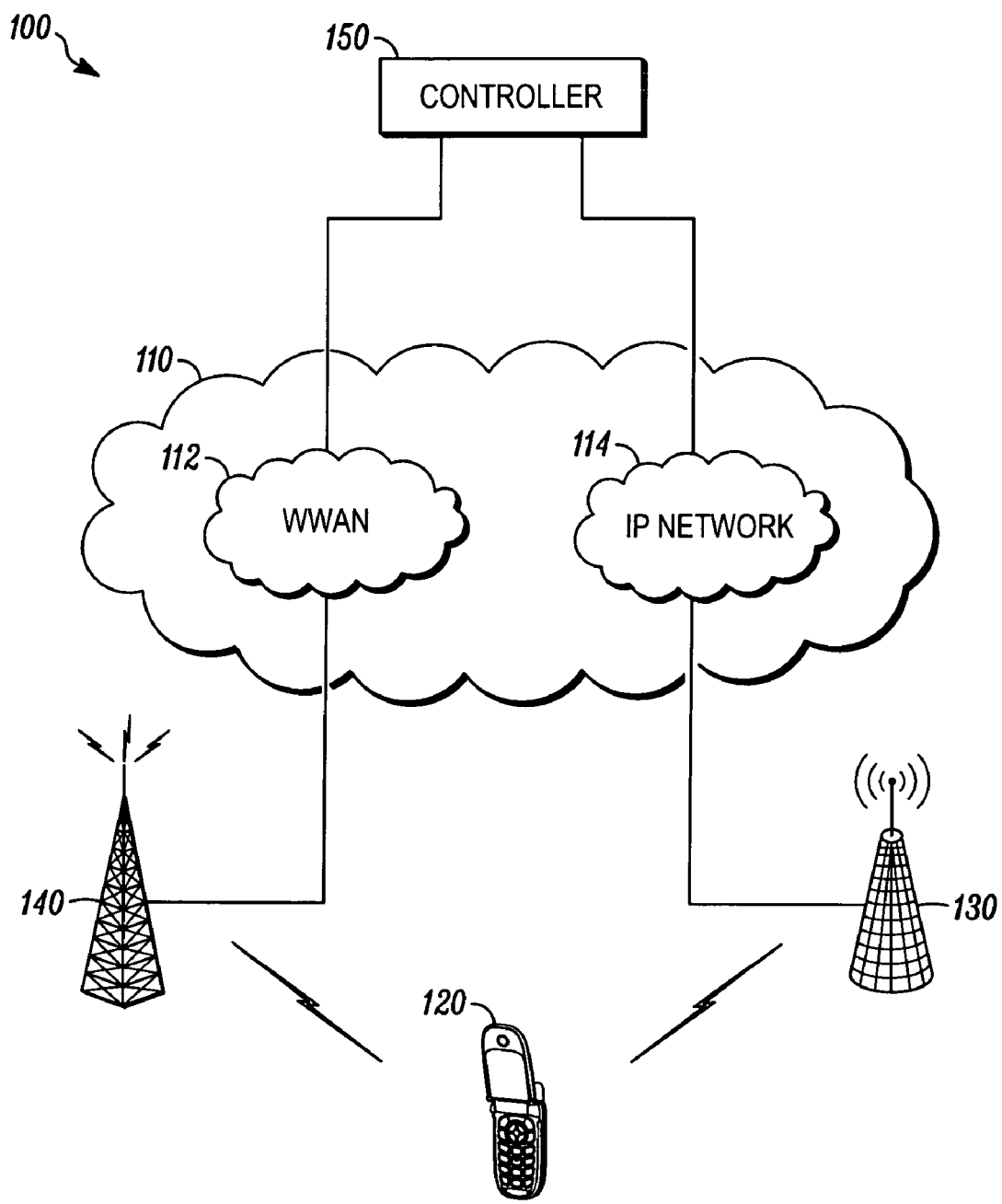
FIG. 1 is an exemplary block diagram of a system according to one embodiment.

FIG. 1 is an exemplary block diagram of a system 100 according to one embodiment. The system 100 can include a network 110, a terminal 120, an access point 130, a base station 140, and a controller 150, such as an unlicensed mobile access network controller. The terminal 120 may be a wireless communication device, such as a wireless telephone, a cellular telephone, a personal digital assistant, a pager, a personal computer, a selective call receiver, or any other device that is capable of sending and receiving communication signals on a network including wireless network. The terminal 120 can include an unlicensed mobile access radio resource module and a mobility management module.

In an exemplary embodiment, the access point 130 can be an access point for a wireless local area network, also known as an unlicensed mobile access wireless local area network or unlicensed wireless local area network, such as a Bluetooth network, an 802.11 network, an infrared network, or any other wireless local area network. The base station 140 can provide access to a wireless wide area network 112, such as a global system for mobile communication network, a time division multiple access network, a cellular network, a code division multiple access network, or any other wireless wide area network. The access point 130 can provide access to an internet protocol network 114. The network 110 may also include any type of network that is capable of sending and receiving signals, such as wireless signals. As a further example, the network 110 may include a wireless telecommunications network, a cellular telephone network, a satellite communications network, and other like communications systems. Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals.

In operation, the terminal 120 can be connected to the access point 130 using a wireless local area network connection. The access point 130 can provide access to the IP network 114, such as the Internet. Using this access point 130, the terminal 120 has access to the Internet and can then connect to a unlicensed mobile access network controller such as the controller 150. The terminal 120 can establish a transport or transmission control protocol connection with the controller 140 through the IP network 114. This connection can be secured using Internet protocol security. Each time a discovery procedure restart timer on the terminal 120 is started or restarted or another failure occurs, the unlicensed mobile access radio resource module can stop a wireless local are network connection to access point 130. This can be done because it may be useless to maintain a connection alive if no data can be transmitted. The unlicensed mobile access radio resource module can inform the mobility management module on the terminal 120 that no service is available. The mobility management module can then camp on the wireless wide area network serviced by the base station 140, if possible.

For example, the terminal 120 may attempt access only if it is not already available from a previous attempt. If wireless wide area network service is available, the terminal 120 can have access to this service. If an unlicensed mobile access network becomes available again and the terminal 120 may connect to it, a mobility management module in the terminal 120 can switch again to unlicensed mobile access network and disconnect from wireless wide area network.

While camped on a wireless wide area network 112 without being connected to the access point 130 the mobility management module can put the unlicensed mobile access radio resource module in scan mode to look for unlicensed mobile access services, such as wireless local area network services. As the discovery procedure restart timer is running, the unlicensed mobile access radio resource module may not try to connect to the access point 130 before the discovery procedure restart timer expires. When the discovery procedure restart timer expires, such as by reaching zero or by counting down or up to a set value or threshold, the unlicensed mobile access radio resource module can attempt a connection to the access point 130 then proceed with the discovery procedure. If the discovery procedure and a registration procedure are completed, a switch procedure from the wireless wide area network to the wireless local area network can occur. Otherwise the discovery procedure restart timer can be doubled and restarted. The terminal 120 can remain, camp, or attempt to camp on the wireless wide area network depending on the previous wireless wide area network status before timer expiry. For example, as soon as the discovery procedure restart timer is running, the link to the access point can be disconnected. This can be done because, in idle mode, for example, an active Bluetooth link can draw around 30-35 milliAmps. Thus, this power consumption will be saved. Similar power consumption can be saved in WiFi links that are used for wireless local area networks. If wireless wide area network coverage is available, the terminal 120 can camp and provide wireless wide area network services to the user instead of having no service while the link to the access point 130 is disconnected.

Thus, a useless connection to the access point 130 can be removed and the terminal 120 can attempt to access wireless wide area network services between each discovery or registration attempt. If the terminal 120 is able to camp on the wireless wide area network, the user of the terminal 120 can get wireless wide area network services as long as the wireless local area network failure is persistent. Once wireless local area network service is available again, the terminal 120 can go back to the wireless local area network.

Figure 2:
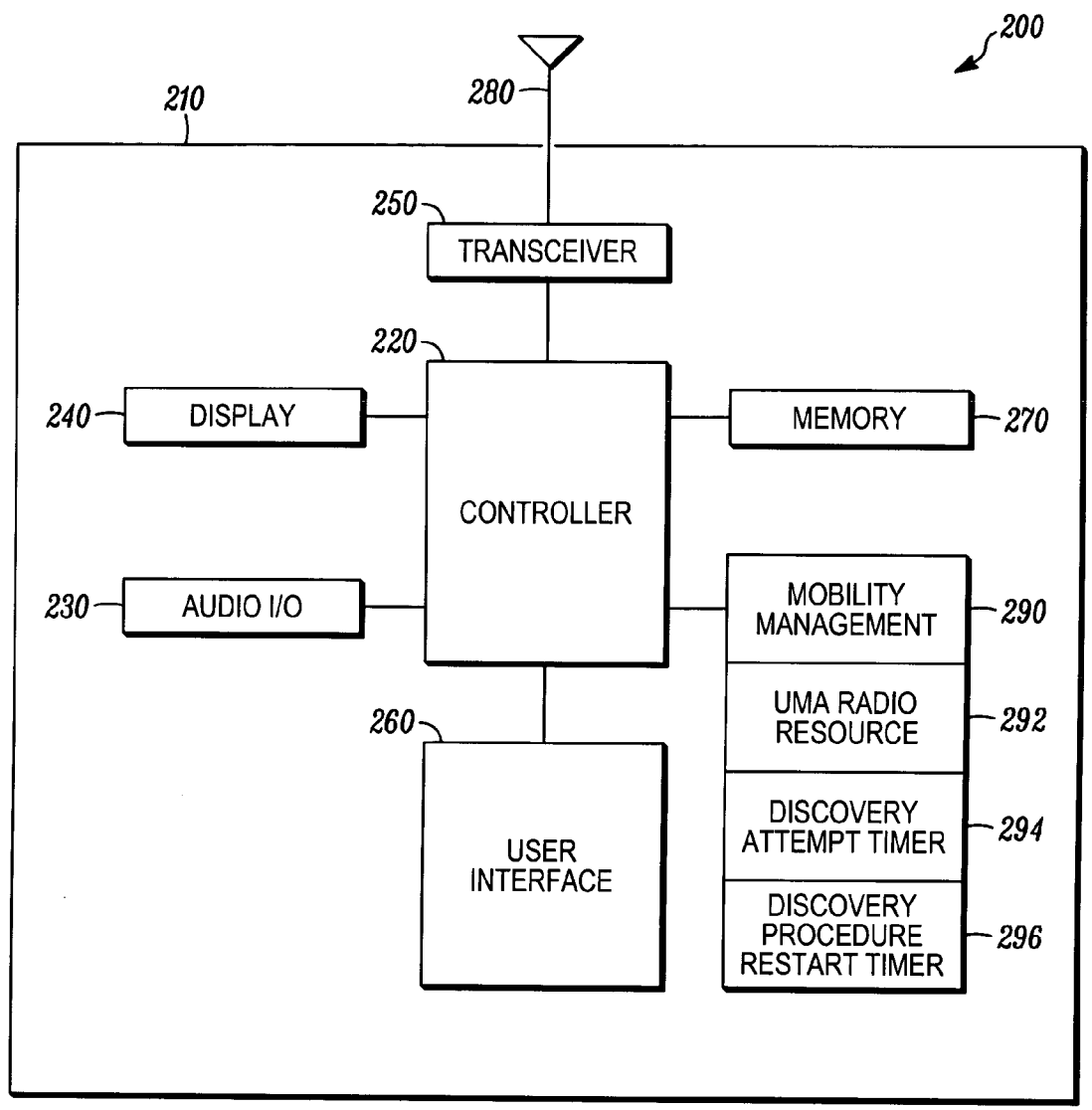
FIG. 2 is an exemplary block diagram of a wireless communication device according to one embodiment.

FIG. 2 is an exemplary block diagram of a wireless communication device 200, such as the terminal 120, according to one embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, and an antenna 280 coupled to the housing 210 and the transceiver 250. The wireless communication device 200 can also include a mobility management module 290, an unlicensed wireless local area network mobile access radio resource module 292, a first timer 294, and a second timer 296. The first timer 294 may be a discovery attempt timer and the second timer 296 may be a reconnection or discovery procedure restart timer. The unlicensed wireless local area network mobile access radio resource module 292 can be a Bluetooth network radio resource module, an 802.11 network radio resource module, or any other wireless local area network radio resource module. The mobility management module 290, the unlicensed wireless local area network mobile access radio resource module 292, the first timer 294, and the second timer 296 can be coupled to the controller 220, can reside within the controller 220, can reside within the memory 270, can be autonomous modules, can be software, can be hardware, or can be in any other format useful for a module on a wireless communication device 200.

The display 240 can be a liquid crystal display (LCD), a light emitting diode (LED) display, a plasma display, or any other means for displaying information. The transceiver 250 may include a transmitter and/or a receiver. The transceiver 250 may be configured to send and receive signals on a wireless wide area network, a wireless local area network, or any other wireless network. Also, the transceiver 250 may include more than one transceiver, where one transceiver may be configured to operate on a wireless wide area network and another transceiver may be configured to operate on a wireless local area network.

The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and a electronic device. The memory 270 may include a random access memory, a read only memory, an optical memory, a subscriber identity module memory, or any other memory that can be coupled to a wireless communication device.

In operation, the unlicensed wireless local area network mobile access radio resource module 292 can detect a failure in a connection to an unlicensed wireless local area network controller and release a wireless local area network access point connection to the unlicensed wireless local area network controller. The unlicensed wireless local area network mobile access radio resource module 292 can report the failure in the connection to an unlicensed wireless local area network controller to the mobility management module 290. The unlicensed wireless local area network mobile access radio resource module 292 can start the second timer 296 in response to detecting the failure. The mobility management module 290 can attempt access to wireless wide area network services in response to receiving a signal from the unlicensed wireless local area network mobile access radio resource module 292 indicating the failure in the connection to the unlicensed wireless local area network controller.

The unlicensed wireless local area network mobile access radio resource module 292 can attempt an unlicensed wireless local area mobile access radio resource discovery procedure or registration procedure when the second timer 296 expires. The unlicensed wireless local area network mobile access radio resource module 292 can detect a failure in connection to the unlicensed network controller by determining the first timer 294 has expired during an unlicensed mobile access radio resource discovery procedure. The unlicensed wireless local area network mobile access radio resource module 292 can also detect a failure in connection to the unlicensed network controller by detecting a poor wireless local area network link between the wireless communication device and a wireless local area network access point, by detecting an inability to resolve a unlicensed wireless local area network controller address given in a fully qualified domain name format, by detecting a routing problem with a transmission control stack at the unlicensed wireless local area network controller, by detecting an issue at a secure gateway level, or by any other procedure for detecting a failure in a connection to an unlicensed network controller. Wireless wide area network services can be global system for mobile communication network services, code division multiple access network services, time division multiple access network services, or any other wireless wide area network services.

According to a related embodiment, the controller 220 can control the operations of the wireless communication device 200. The discovery attempt timer 294 can start a timing procedure in response to a first discovery request initiated by the unlicensed wireless local area network mobility access radio resource module 292. The unlicensed wireless local area network mobile access radio resource module 292 can initiate the first discovery request, detect a failure in a connection to an unlicensed wireless local area network controller in response to the expiration of the discover attempt timer 294, and release a wireless local area network access point connection to the unlicensed wireless local area network controller prior to initiating a second discovery request. The unlicensed wireless local area network mobile access radio resource module 292 can start the discovery procedure restart timer 296 in response to detecting the failure. The mobility management module 290 can attempt access to wireless wide area network services in response to receiving a signal from the unlicensed wireless local area network mobile access radio resource module 292 indicating the failure in the connection to the unlicensed wireless local area network controller. The unlicensed wireless local area network mobile access radio resource module 292 can also attempt another unlicensed wireless local area mobile access radio resource discovery procedure when the discovery procedure restart timer 296 expires.

As a further example of the operation of the wireless device, the unlicensed wireless local area network mobile access radio resource module 292 allows the acquisition of unlicensed mobile access service when it is available. It can perform necessary signaling to allow for receiving and transmitting data over an unlicensed mobile access service. For example, the unlicensed wireless local area network mobile access radio resource module 292 can be responsible for the discovery and registration procedure on a wireless local area network.

The mobility management module 290 can ask for service which can be over a wireless wide area network or over a wireless local area network. For example, the mobility management module 290 can ask for service over an unlicensed mobile access service or over a global system for mobile communication service. I.e., the mobility management module 290 can ask for a wireless wide area network or wireless local area network resource. If a wireless local area network resource is needed, the unlicensed wireless local area network mobile access radio resource module 292 can try to connect and register to an unlicensed network controller. Meanwhile, another radio resource management module in the controller 220 can perform a periodic scan on a wireless wide area network to have more information on the wireless wide area network environment. If the mobility management module 290 is asking for wireless wide area network services, the other radio resource can start camping procedure to register on a wireless wide area network. Meanwhile, the unlicensed wireless local area network mobile access radio resource module 292 can start scanning for a wireless local area network access point to detect potential wireless local area network service availability. Thus, there can be one radio access technology active and one radio access technology in scanning mode. The active radio access technology can be chosen by the mobility management module 290 and resource handling or scanning can be performed by the unlicensed wireless local area network mobile access radio resource module 292 or another radio resource module.

Figure 3:
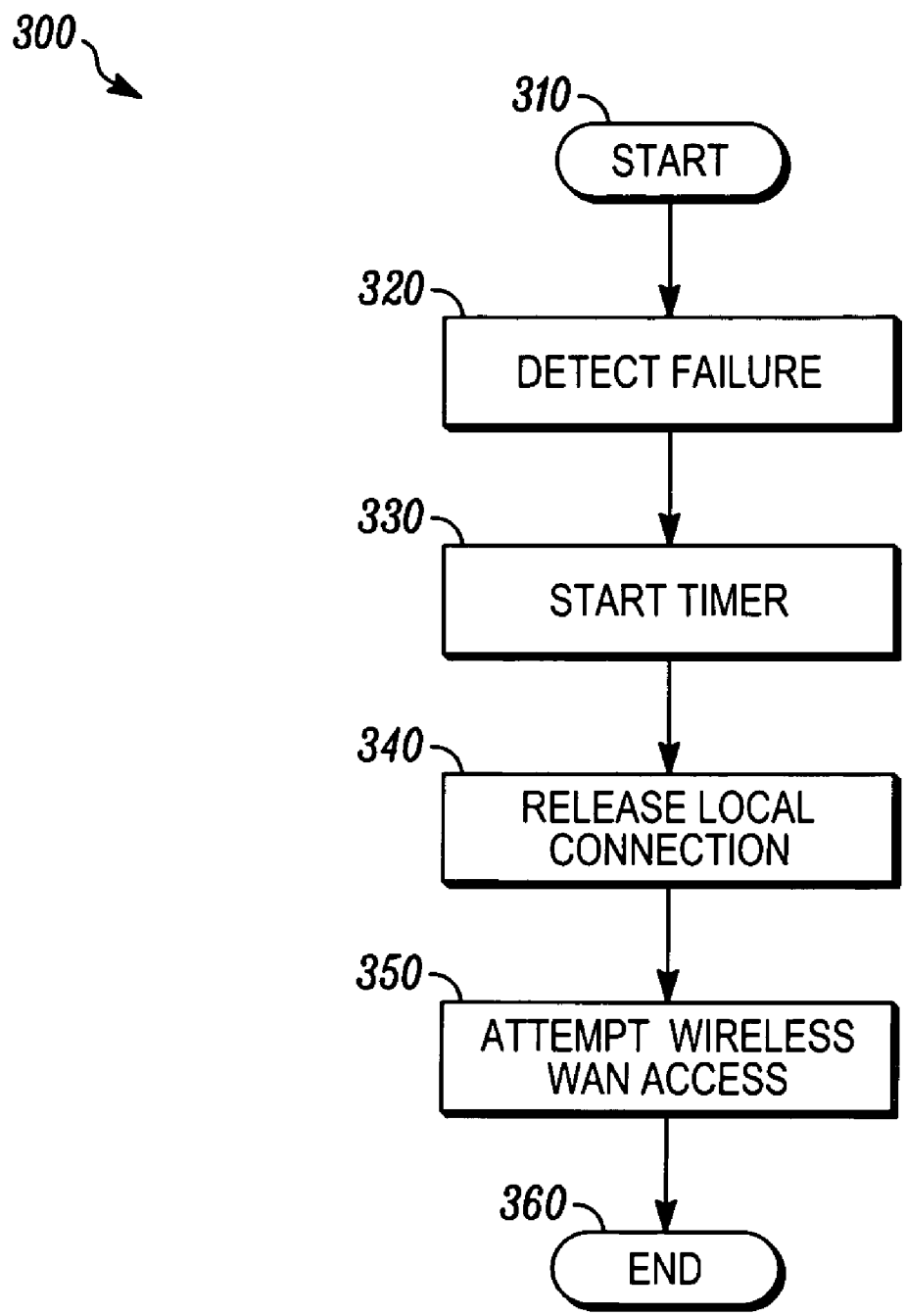
FIG. 3 is an exemplary flowchart illustrating the operation of a wireless communication device according to one embodiment.

FIG. 3 is an exemplary flowchart 300 illustrating the operation of the wireless communication device 200 according to another embodiment. In step 310, the flowchart begins. In step 320, the wireless communication device 200 can detect a failure in a connection to the unlicensed network controller 150. The connection to the access point 130 used to provide access to the unlicensed mobile access network controller 150 can be a Bluetooth network, an 802.11 network, or any other unlicensed wireless local area network. For example, the wireless communication device 200 can detect the failure during an unlicensed network controller discovery procedure. Detecting a failure in connection to the unlicensed network controller 150 may include determining a discovery attempt timer has expired during an unlicensed mobile access radio resource discovery procedure. Detecting a failure in connection to the unlicensed network controller 150 may also include detecting a poor wireless local area network link between the wireless communication device and the wireless local area network access point 130. Detecting a failure in connection to the unlicensed network controller 150 may additionally include detecting an inability to resolve an unlicensed wireless local area network controller address given in a fully qualified domain name format. Detecting a failure in connection to the unlicensed network controller 150 may further include detecting a routing problem with a transmission control stack at the unlicensed wireless local area network controller. Detecting a failure in connection to the unlicensed network controller 150 may also include detecting an issue at a secure gateway level or an issue with any security protocols.

In step 330, the wireless communication device 200 can start a timer in response to detecting the failure. In step 340, the wireless communication device 200 can release a wireless local area network access point connection to the unlicensed wireless local area network controller. In step 350, the wireless communication device 200 can attempt to access wireless wide area network services. The wireless wide area network services may be global system for mobile communication network services, code division multiple access network services, time division multiple access network services, or any other wireless wide area network services. The timer can be a discovery procedure restart timer and the wireless communication device 200 can attempt another unlicensed wireless local area mobile access radio resource discovery procedure when the discovery procedure restart timer expires. In step 350, the flowchart 300 can end. The wireless communication device 200 can perform the steps in the flowchart 300 again by initiating additional unlicensed wireless local area network discovery procedures.

Figure 4:
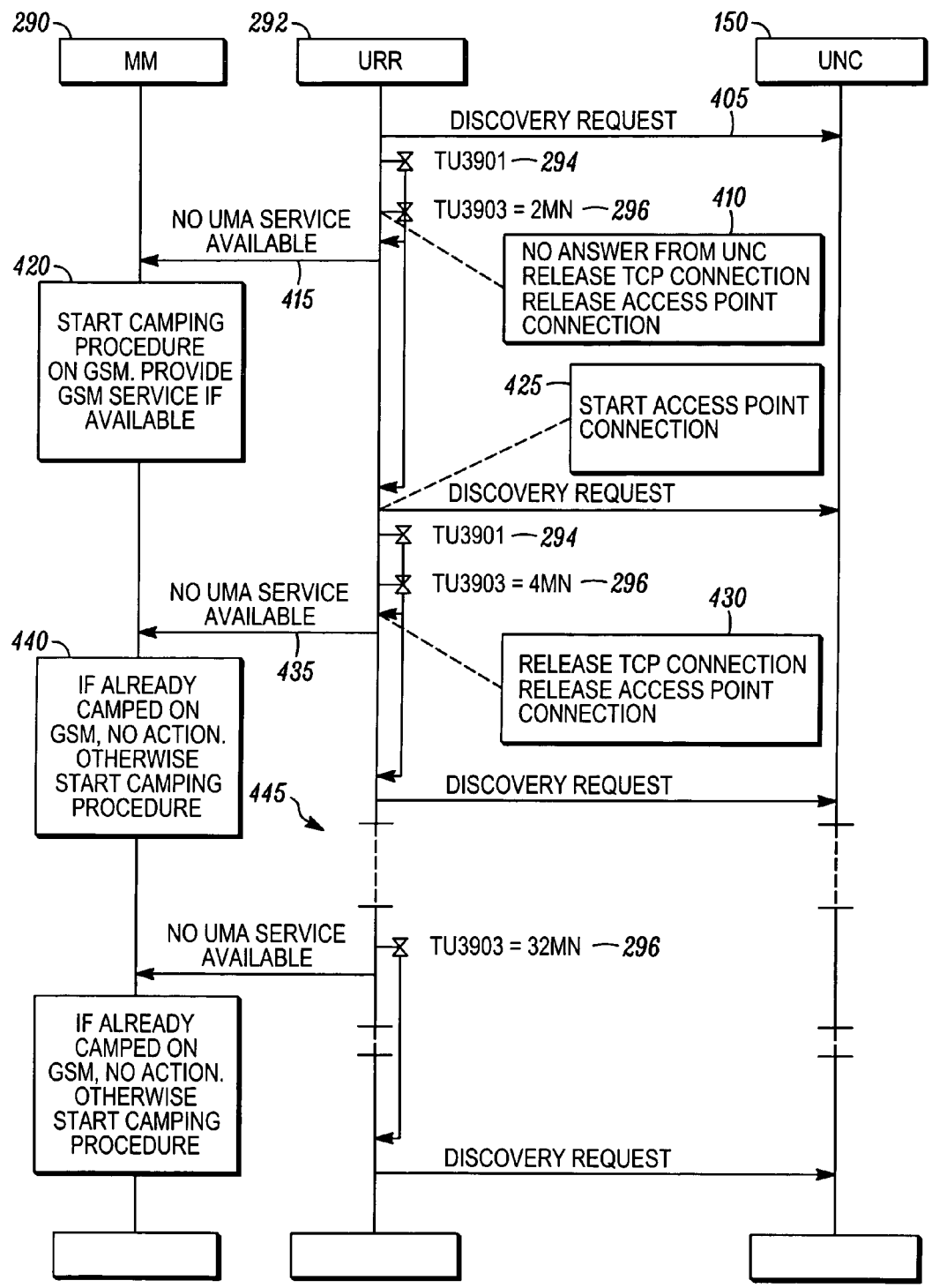
FIG. 4 is an exemplary signal flow diagram according to one embodiment.

FIG. 4 is an exemplary signal flow diagram 400 according to one embodiment. The signal flow diagram 400 illustrates signals sent between the mobility management module 290, the radio resource module 292, and an unlicensed mobile access network controller 150. In step 405, the radio resource module 292 can initiate a discovery request for the unlicensed mobile access network controller 130 and start the discovery attempt timer 294. In step 410, if the discovery attempt timer 294 expires with no answer from the unlicensed mobile access network controller 150, the radio resource module 292 can release a transport control protocol connection, release an access point connection with the unlicensed mobile access network controller 150, and start the discovery procedure restart timer 296. Additionally, step 410 can be performed based on any other failure aside from or along with the expiration of the discovery attempt timer 294. In step 415, the radio resource module 292 can inform the mobility management module 290 of a wireless local area network access failure. In step 420, the mobility management module 290 can start a camping procedure on a wireless wide area network, such as a global system for mobile communication network, and provide wireless wide area network service, if it is available. In step 425, when the discovery procedure restart timer expires, the radio resource module 292 can reinitiate the access point connection and the radio resource module 292 can initiate another discovery request to the unlicensed mobile access network controller 150 and start the discovery attempt timer 294. In step 430, if the discovery attempt timer 294 expires with no answer from the unlicensed mobile access network controller 150, the radio resource module 292 can release a transport control protocol connection, release an access point connection with the unlicensed mobile access network controller 150, double the time of the discovery procedure restart timer 296, and start the discovery procedure restart timer 296. In step 435, the radio resource module 292 can inform the mobility management module 290 that wireless local area network access is still unavailable. In step 440, the mobility management module 290 can maintain wireless local area network service or, if there is no current connection to a wireless local network, start a camping procedure on a wireless wide area network, if it is available. In subsequent steps 445, the procedure can be continued.

The method of this disclosure is preferably implemented on a programmed processor. However, the controllers, flowcharts, and modules may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

What is claimed is:

1. A method in a wireless communication device, comprising:
    providing a wireless communication device including: a controller configured to control the operations of the wireless communication device; a transceiver coupled to the controller; a discovery attempt timer configured to start a timing procedure in response to a first discovery request; an unlicensed wireless local area network mobile access radio resource module coupled to the controller and the discovery attempt timer, the unlicensed wireless local area network mobile access radio resource module configured to initiate the first discovery request, detect a failure in a connection to an unlicensed network controller in response to an expiration of the discover attempt timer, and release a wireless local area network access point connection to the unlicensed network controller prior to initiating a second discovery request; and a discovery procedure restart timer coupled to the controller and the unlicensed wireless local area network mobile access radio resource module, wherein the unlicensed wireless local area network mobile access radio resource module starts the discovery procedure restart timer in response to detecting the failure;
    operating the wireless communication device on a wireless local area network by being coupled to the unlicensed wireless local area network mobile access radio resource module; and
    configuring the wireless communication device with a mobility management module coupled to the controller, the mobility management module configured to attempt access to wireless wide area network services in response to receiving a signal from the unlicensed wireless local area network mobile access radio resource module indicating the failure in the connection to the unlicensed network controller.

2. The method according to claim 1, further comprising starting a reconnection procedure restart timer in response to detecting the failure.

3. The method according to claim 2, further comprising attempting an unlicensed wireless local area mobile access radio resource discovery procedure when the reconnection procedure restart timer expires.

4. The method according to claim 1, wherein detecting a failure in connection to the unlicensed network controller comprises determining a discovery attempt timer has expired during an unlicensed mobile access radio resource discovery procedure.

5. The method according to claim 1, wherein detecting a failure in connection to the unlicensed network controller comprises detecting a poor wireless local area network link between the wireless communication device and a wireless local area network access point.

6. The method according to claim 1, wherein detecting a failure in connection to the unlicensed network controller comprises detecting an inability to resolve a unlicensed wireless local area network controller address given in a fully qualified domain name format.

7. The method according to claim 1, wherein detecting a failure in connection to the unlicensed network controller comprises detecting a routing problem with a transmission control stack at the unlicensed wireless local area network controller.

8. The method according to claim 1, wherein detecting a failure in connection to the unlicensed network controller comprises detecting an issue with a security protocol.

9. The method according to claim 1, wherein the wireless local area network comprises an wireless local area network selected from the group of a Bluetooth network and an 802.11 network.

10. The method according to claim 1, wherein wireless wide area network services comprise services selected from the group of global system for mobile communication network services, code division multiple access network services, and time division multiple access network services.

11. A wireless communication device comprising:
    a controller configured to control the operations of the wireless communication device;
    a transceiver coupled to the controller;
    a discovery attempt timer configured to start a timing procedure in response to a first discovery request;
    an unlicensed wireless local area network mobile access radio resource module coupled to the controller and the discovery attempt timer, the unlicensed wireless local area network mobile access radio resource module configured to initiate the first discovery request, detect a failure in a connection to an unlicensed network controller in response to an expiration of the discover attempt timer, and release a wireless local area network access point connection to the unlicensed network controller prior to initiating a second discovery request;

a discovery procedure restart timer coupled to the controller and the unlicensed wireless local area network mobile access radio resource module, wherein the unlicensed wireless local area network mobile access radio resource module starts the discovery procedure restart timer in response to detecting the failure; and a mobility management module coupled to the unlicensed wireless local area network mobile access radio resource module, the mobility management module configured to attempt access to wireless wide area network services in response to receiving a signal from the unlicensed wireless local area network mobile access radio resource module indicating the failure in the connection to the unlicensed network controller.

12. The wireless communication device according to claim 11, wherein the discovery procedure restart timer comprises a registration procedure restart timer.

13. The wireless communication device according to claim 12, wherein the unlicensed wireless local area network mobile access radio resource module is further configured to attempt an unlicensed wireless local area mobile access radio resource discovery procedure when the registration procedure restart timer expires.

14. The wireless communication device according to claim 11, wherein the unlicensed wireless local area network mobile access radio resource module is further configured to detect a failure in connection to the unlicensed network controller by determining the discovery attempt restart timer has expired during an unlicensed mobile access radio resource discovery procedure.

15. The wireless communication device according to claim 11, wherein the unlicensed wireless local area network mobile access radio resource module is further configured to detect a failure in connection to the unlicensed network controller by one selected from the group of detecting a poor wireless local area network link between the wireless communication device and a wireless local area network access point, detecting an inability to resolve a unlicensed wireless local area network controller address given in a fully qualified domain name format, detecting a routing problem with a transmission control stack at the unlicensed wireless local area network controller, and detecting an issue at a secure gateway level.

16. The wireless communication device according to claim 11, wherein the resource module comprises a resource module selected from the group of a Bluetooth network resource module and an 802.11 network resource module.

17. The wireless communication device according to claim 11, wherein wireless wide area network services comprise services selected from the group of global system for mobile communication network services, code division multiple access network services, and time division multiple access network services.

18. The wireless communication device according to claim 11, wherein the unlicensed wireless local area network mobile access radio resource module is further configured to report the failure in a connection to an unlicensed wireless local area network controller to the mobility management module.

19. A wireless communication device comprising:
a controller configured to control the operations of the wireless communication device;
a transceiver coupled to the controller;
a discovery attempt timer configured to start a timing procedure in response to a first discovery request;
an unlicensed wireless local area network mobile access radio resource module coupled to the controller and the discovery attempt timer, the unlicensed wireless local area network mobile access radio resource module configured to initiate the first discovery request, detect a failure in a connection to an unlicensed network controller in response to an expiration of the discover attempt timer, and release a wireless local area network access point connection to the unlicensed network controller prior to initiating a second discovery request;
a discovery procedure restart timer coupled to the controller and the unlicensed wireless local area network mobile access radio resource module, wherein the unlicensed wireless local area network mobile access radio resource module starts the discovery procedure restart timer in response to detecting the failure; and
a mobility management module coupled to the unlicensed wireless local area network mobile access radio resource module, the mobility management module configured to attempt access to wireless wide area network services in response to receiving a signal from the unlicensed wireless local area network mobile access radio resource module indicating the failure in the connection to the unlicensed network controller,
wherein wireless wide area network services comprise services selected from at least one of global system for mobile communication network services, code division multiple access network services, and time division multiple access network services.

20. The wireless communication device according to claim 19, wherein the unlicensed wireless local area network mobile access radio resource module is further configured to attempt an unlicensed wireless local area mobile access radio resource discovery procedure when the discovery procedure restart timer expires.

* * * * *